E. T. FERNGREN.
REMOVING OF GLASS FROM FURNACES.
APPLICATION FILED SEPT. 4, 1913.
1,342,042.
Patented June 1, 1920.
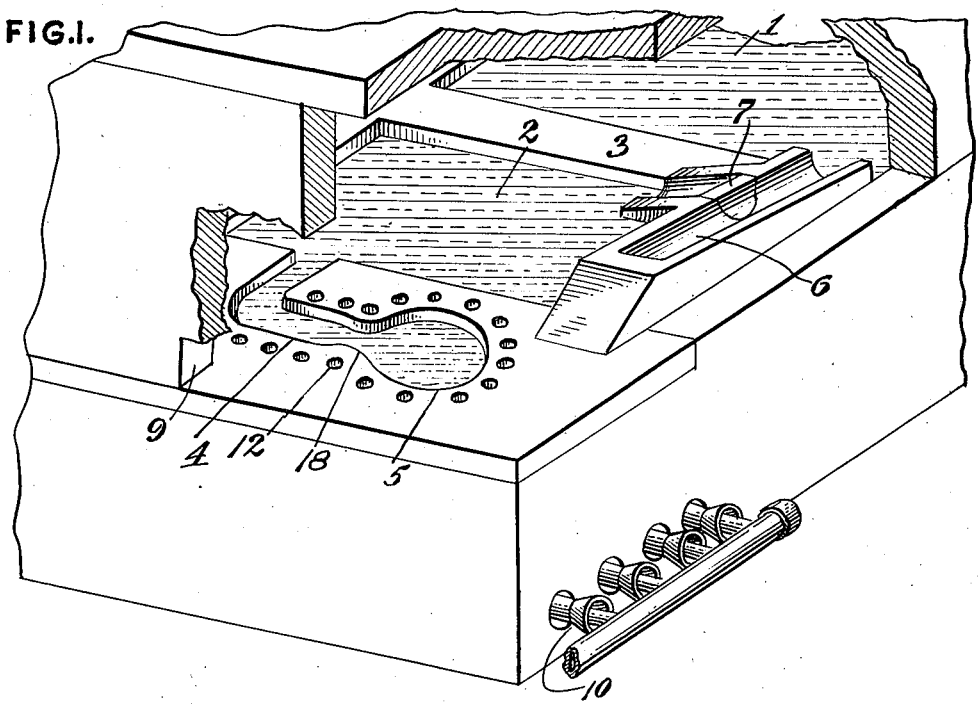
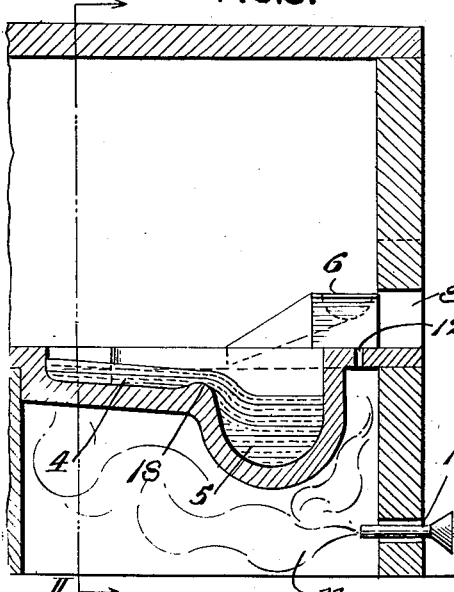
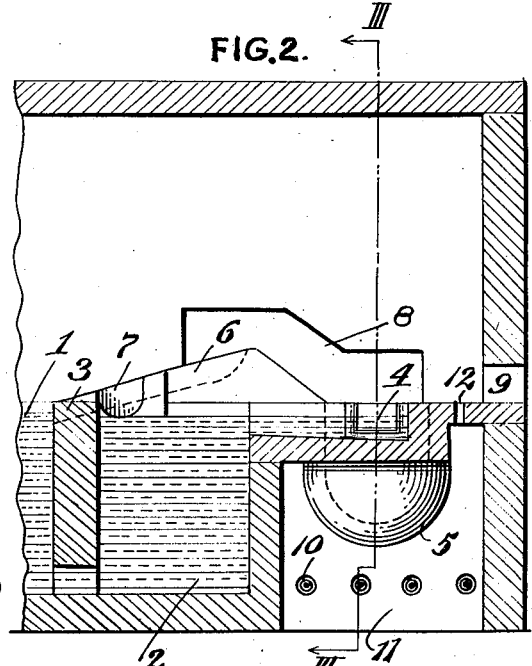
WITNESSES:
Paul N. Critchlow
Frances J. Tomasson
INVENTOR
Enoch T. Ferngren
by Christy and Christy
Attys

UNITED STATES PATENT OFFICE.

ENOCH T. FERNGREN, OF BEAVER, PENNSYLVANIA.

REMOVING OF GLASS FROM FURNACES.

1,342,042.  Specification of Letters Patent.  Patented June 1, 1920.

Application filed September 4, 1913. Serial No. 788,174.

*To all whom it may concern:*

Be it known that I, ENOCH T. FERNGREN, residing at Beaver, in the county of Beaver and State of Pennsylvania, a citizen of Sweden, have invented or discovered certain new and useful Improvements in Removing of Glass from Furnaces, of which improvements the following is a specification.

The object of my invention is to provide a method of operating a glass melting and refining furnace, whereby successive quantities of molten glass may be removed from the surface of the batch without having any prejudicial effect upon the glass remaining in the furnace.

While various methods and means have been suggested for removing relatively small quantities of glass from a furnace, in practice it has been found that the best results are to be had when the glass is removed directly from the molten mass through its surface, as by means of punties, ladles, or suction molds. There is, however, one difficulty which is always present to a greater or less degree in thus removing glass through the surface of the batch. The continuously recurring contacts of the glass remover, whether it be punty, ladle or suction tool, cools and otherwise locally injures the molten mass, the amount of injury done depending upon the area of glass surface over which the contacts are made by the removers. If the glass is manually removed by punties or ladles the injury to it may be negligible, because the punties or ladles will scarcely ever be dipped by workmen into the glass at the same point of its surface a number of times in succession, so that the local surface cooling caused by one contact of a remover will usually be dissipated by the heat of the furnace before another remover dips into the surface at the same point. However, when machines, such as suction molds, are used for removing the glass, the mechanically-operated removing tool dips into the mass each time at substantially the same point, thus causing a very appreciable cooling and injuring of the glass. Because of this glass-removing suction molds, which for many reasons are very desirable, have been found to be practially useless for high class work.

My invention proceeds primarily upon a certain physical quality of a body of molten glass, namely, its surface tension. The surface layer of glass, particularly when such surface is slightly coagulated tends to hold together, so that when one part of such surface is moved in the plane of its extent the remaining surface layer tends to move with it. This is the case whether the surface layer is moved mechanically, as by touching it with a suitable tool or rod and moving such instrument horizontally, or by causing a gravity overflow of the surface. In the latter case, as the surface layer passes over and falls below the crest, it will, by the gravity action of its fall, exert a pull on the surface of the molten mass within the container and will flow more rapidly than the glass immediately below the surface layer.

In the practice of my invention, in order to remove glass directly through or from its surface and at the same time prevent glass, cooled by contact with preceding removers, from being taken from the batch, I effect a movement of the surface layer thereof and take successive quantities of the molten glass from successive points thereof. The flow of the surface layer may be effected in various ways, but I preferably accomplish it by a gravity overflow, and in the illustrative embodiment of my invention such gravity flow is effected through a trough or duct leading from a furnace or other glass refining or melting receptacle. Thus such glass as is cooled by each remover will flow beyond the point at which the next successive remover will take glass; or, in other words, each remover will dip into fresh uncongealed or otherwise injured glass.

In carrying out the preferred method, thus described, it will be understood that the overflow passage or area must be of sufficient size to prevent a clogging of the glass within such passage. Furthermore, when the glass is led through a trough or duct from a containing receptacle, the duct should be heated, otherwise the glass will congeal to such an extent that it will be impossible to obtain a surface flow thereof. My improved method further contemplates the returning of the overflown glass to the original container, and in such a manner and under such conditions that the consistency thereof will not be prejudicially effected, as by chilling.

The method which I have just described may be practised in a furnace such as is illustrated in the accompanying drawing, but it will be understood that it may be likewise employed in various other furnace constructions.

Figure 1 of the drawing is an isometric view of one corner of a glass melting and refining furnace, a portion of the outer wall being broken away to show the interior construction; Fig. 2 is a vertical sectional view taken through the right side of the furnace inside the wall thereof, the plane of section being indicated by the line II, II, Fig. 3; and Fig. 3 is a vertical sectional view, taken on the line III III, Fig. 2.

In the several figures like numerals are used to designate like parts.

The furnace may be of the usual type wherein a melting chamber 1 and a refining chamber 2 are separated by a refractory wall 3, the heating being effected by gas flames playing on the surface of the glass. In order to lead a continuously flowing stream of molten glass from the refining chamber 2, and to effect a gravity overflow of the surface thereof, I provide a trough 4 extending with a slight downward inclination from the front of the refining chamber, the trough preferably opening into an enlarged receptacle 5 adapted to receive such glass as is not removed from the trough while flowing therethrough. The glass flowing into the receptacle 5 may be returned to the furnace in any desired manner. The means to this end shown herein consist of a conduit 6, inclined downwardly from the front of the furnace, and having outlets into both the refining and melting chambers, there being a suitable removable block 7 adapted to close one or the other of the conduit outlets. Whether the glass be returned to the melting or to the refining chamber will depend, of course, on its condition when removed from the receptacle. The glass may be transferred from the receptacle 5 to the trough by any desired means, such as a ladle, it being only necessary to keep the level of the glass in the receptacle 5 sufficiently below the level of that in the refining chamber 2 to cause the proper stream of glass to flow through the trough 4. To effect such ladling a suitable inclined slot 8 may be provided in the side wall of the furnace, through which the handle of a ladle may extend.

The size of the trough 4 will depend for the most part upon the amount of glass usually desired to remove from it. In order to effect an even flow of the glass and at the same time present as much surface width as necessary, the trough may be contracted adjacent to the receptacle 5, as at 18, and the glass removed from the portion of the trough lying rearwardly of such contracted portion, there being a suitable opening 9 formed in the furnace wall adjacent to such portion. The contracted portion 8 of the trough preferably extends upwardly from the bottom, thereby causing a greater surface flow of the glass, it being understood that it is primarily the surface layer of the glass that is to be moved, and that such surface is the part cooled by the contact of the remover. To effect such a continuous flow of molten glass as will be necessary to practise my invention, the walls of the trough must be maintained at a high temperature. In the furnace illustrated herein the trough-heating means consist of gas burners 10 extending into a combustion chamber 11, there being holes 12 through the roof of such chamber adjacent to the trough 4 through which the hot gases may escape.

In operation, the flow of glass, and particularly its surface layer, through the trough 4 may be started by ladling or otherwise removing the glass from the receptacle 5 to one or the other of the furnace chambers. This transfer of the glass will be continued as long as it is desired to have a continuous flow of the glass through the trough, the general position of the glass when flowing being indicated in Fig. 3. Suction molds or any other form of glass removers may then be used to take successive quantities of glass from the flowing stream through the surface thereof, and each time a remover dips into the stream it will dip into fresh and uncooled glass.

The herein described method is in a manner related to the matter disclosed in my copending apparatus applications Ser. No. 679,236, filed February 23, 1912, and Ser. No. 682,895, filed March 11, 1912, wherein a similar object and purpose of delivering glass of consistent fluidities to shaping mechanism, but under different conditions, are carried out by the means used and the operation of the mechanism involved.

I claim as my invention:

1. The herein described method of gathering molten glass, which consists in effecting a gravity flow of the surface layer of a body of glass, and gathering portions of glass from the flowing surface.

2. The herein described method of gathering molten glass from a heating receptacle, which consists in effecting a gravity flow of the surface layer of the glass in a continuous stream from such receptacle, and removing successive quantities from such flowing stream through successive surface points thereof.

3. In glass manufacture, the process which consists in flowing a stream of molten glass of consistent fluidities from a melting tank and successively removing portions thereof in gathering means during said flowing, and successively flowing the portions of said stream that became less molten, from contact with said gathering means, toward a point removed from association with the gathering means and collecting said less molten portions in a receptacle and transferring said collected glass back into the furnace to be restored to a desirable fluid state.

4. The method of providing a uniformly molten surface of glass and gathering therefrom, which consists in creating a surface current on a body of glass in a furnace and successively associating gathering means with said body through said surface and removing charges of glass in said means, and successively flowing the surface portions of said body of glass that became chilled from contact with said gathering means to a lower surface level in said furnace and returning said chilled glass to the body of glass in the melting portion of said furnace by transferring means and maintaining a constant lower level and a desirable velocity of stream current on the body of glass by the frequency of said returning.

5. In glass manufacture, the process which consists in advancing a stream of glass from a melting tank through a heated duct, slightly inclined on a horizontal plane, and obstructing the advancing of the lower portion of said stream by a transverse obstruction across said duct, and flowing the surface portions of said stream over said obstruction into a heated receptacle in said furnace, and successively gathering and removing successive mold charges from successive surface points of said stream, thereby successively flowing the surface portions of said stream, that became coagulated from contact with said gathering means, over said obstruction into said receptacle, and maintaining the glass in said receptacle at a lower level than the glass in said duct and insuring a continuity of surface flow thereinto by periodic transferring of the glass collecting in said receptacle to the higher surface level of the molten glass in said melting tank.

6. The method of removing mold charges of glass from the surface, which consists in flowing and circulating molten glass within heated limits in a manner to expose the surface thereof to periodic contact with the glass removing means, and removing mold charges in said means from said glass during its flowing.

7. In glass manufacturing, the method which consists in causing a flow of molten glass of constant fluidity from a part that contains a supply thereof, flowing the said glass through a passage and periodically touching and removing quantities of glass from transient previously untouched portions of the glass at said passage.

8. The method of gathering glass, which consists in effecting an overflow from the surface layer of a body of glass, and successively removing mold charges from said surface before it overflows.

9. In glass manufacturing, the method which consists in advancing molten glass from a higher to a lower surface level, and successively removing mold charges from successive surface points of the advancing glass before it reaches said lower level and then returning said advancing glass from the lower to higher level by transferring means while said glass is in a molten state.

10. The method of gathering glass, which consists in advancing a stream of molten glass from a body of the same, periodically removing mold charges from the stream during its advancing and while said stream is surrounded with glass melting temperature conditions.

11. In glass manufacturing, the method which consists in continuously advancing molten glass into and through an enveloping uniformly highly heated zone and periodically abstracting mold charges from said glass, while in forward transit through said zone.

12. In glass manufacturing, the method which consists in effecting a continual advance of clarified glass of consistent fluidity into a stationary, partly confining furnace part, exposing the surface of the said glass to the action of glass removers, and successively removing quantities of glass from within said part, and causing each portion of the surface of said glass that was exposed to the action of the glass removers to be deposited outside of the furnace part by the action of gravity, before each recurrent removal of a quantity of glass from the surface portion within said part.

13. In glass manufacturing, the method which consists in creating a directionally predetermined and constant flow of refined glass of homogeneous fluidity, maintaining the constancy of the fluidity in the said glass, and taking successive gathers from untouched portions of the surface of the flowing glass.

In testimony whereof I have hereunto set my hand.

ENOCH T. FERNGREN.

Witnesses:
PAUL N. CRITCHLOW,
FRANCIS J. TOMASSON.